United States Patent Office 2,910,367
Patented Oct. 27, 1959

2,910,367

FOOD COMPOSITION

Daniel Melnick, Teaneck, N.J., George A. Perry, Elmhurst, N.Y., and Jack Akerboom, Lincroft, N.J., assignors to Corn Products Company, a corporation of Delaware No Drawing. Application July 9, 1957
Serial No. 670,628

19 Claims. (Cl. 99—150)

This invention relates to novel compositions which are especially adapted as food flavor stabilizers and inhibitors of microbiological growth, as well as to food salads which can be stored for heretofore impossibly long periods of time without appreciable loss of flavor and without fear of creating a health hazard.

Sickness resulting from improperly handled food is not uncommon, particularly where there is inadequate food refrigeration or where the cook is ignorant of the basic sanitary concepts concerning food preparation, preservation and storage. The common household tests applied to foods in determining their edibility are appearance, odor and flavor. Foods unintentionally contaminated with yeasts and molds are usually spotted and discarded based on their characteristic odor and appearance. Food poisoning bacteria such as for example certain types of the Clostridium may produce a putrid odor and when this happens the food should be rejected. However, other food poisoning bacteria such as the Salmonella, Streptococcus and Staphylococcus can produce sickness when eaten, yet they may not be detected through the customary methods of organoleptic examination. Such is the case with potato salad, macaroni salad and other salads involving fish, meat and eggs. When sickness results from eating these foods, the mayonnaise dressing is frequently held to be the source of contamination. When mayonnaise dressing is properly made under sanitary conditions, there is sufficient acid, e.g. in the form of vinegar, and salt present in the aqueous phase to produce unfavorable conditions for the development of food poisoning bacteria. If the dressing is diluted and the acid present neutralized with nutrient material such as for example, potato, macaroni, fish, meat or eggs as in making a salad, the acid and salt in the dressing may no longer be present in protective concentrations and the salad is readily subject to spoilage through insanitary preparation practices, poor or intermittent refrigeration and excessive shelf storage. Once the product has left the manufacturing center, the manufacturer has little control over the conditions under which the product is kept.

To illustrate present manufacturing practices for conventional "ready to eat" salads, attention is focused on the following commercial method for making refrigerated potato salad. The potatoes are washed and peeled by the use of conventional abrasive, lye or steam methods and then the eyes and blemishes are removed by hand. The potatoes are cooked whole to prevent excessive losses due to sloughing, fracturing or mashing in the cooking vat. Pre-peeled raw potatoes which have been dipped in a color preserving liquid may also be used, however, from an economic standpoint, it is usually desirable to do the peeling operation at the manufacturing center. The liquid used to prevent discoloration of raw potatoes for pre-peeled potatoes may consist of an aqueous solution of sodium bisulfite, citric, phosphoric and/or ascorbic acids. The whole potatoes are cooked until tender by autoclaving or at atmospheric pressure in either plain or salted water; they are then drained, and air cooled.

After cooling, the potatoes are sliced by hand or machine into the desired size, blended with the dressing and, if desired, chopped vegetable meats. The dressing consists of mayonnaise, salad dressing or combinations thereof with or without added flavoring agents, sugar, salt and preserving agents against microbiological spoilage. The preserving agents consisting of sorbic or benzoic acid may be added to the dressing at a level of 0.1% by weight, on the dressing basis. Supplements of chopped vegetables, if used, may consist of onion, carrot, pepper and celery alone or in combinations thereof.

Macaroni salad, fish, meat or egg salads are prepared by adding the above described dressing thereto. The solid food components do not contain the preserving agent at the time of formulation.

Market distribution practices for the described salads demand constant refrigerated storage from the time of manufacture to the time of consumption to inhibit the growth of food poisoning organisms. Usually the expectation is a shelf life encompassing no more than two weekends or a total of 11 to 12 days. Such demands restrict distribution to an area within a serviceable radius of the manufacturing center. In connection with microbiological growth, as few as 5 hours at room temperature is sufficient to allow bacteria to develop to such a degree in some foods as to induce food poisoning when eaten. Since it is impossible to guarantee that these products will always be kept under proper refrigeration, there exists a potential food poisoning hazard. Only when refrigeration is held just above the freezing point of the cooked food and guaranteed throughout the shelf life, is it possible to extend the shelf life of present salads to 28 days. However, at this time flavor deterioration has progressed to such a point that the product is no longer edible.

It is recognized that the original fresh flavor of salads, viz., potato salad, begins to deteriorate shortly after manufacture and this off-flavor becomes progressively more readily detectable, so that two weeks is usually the maximal period for acceptable flavor life. After four weeks' storage in the refrigerated state, the potato salad develops a stale, musty flavor that is very objectionable to the consumer. Certain risks and drawbacks are therefore associated with the prior art in making the refrigerated "ready to eat" salads for the retail trade. For this reason, no attempt has been made to manufacture such salads on a national scale for mass distribution.

Accordingly, an object of this invention is to provide a novel food additive which is effective in stabilizing food flavor and inhibiting microbiological growth.

Another object is to provide food salads which can be stored for appreciable periods of time without undue loss of flavor and without becoming a health hazard.

Other objects and advantages will become apparent from the following description and explanation of the invention.

In accordance with this invention the novel food additive comprises about 0.0004 to 2% ethylenediaminetetraacetic acid, as the free acid or as its soluble salts, and about 0.015 to 0.3% of a fungistat. More particularly, the invention is concerned with a food salad in which the food component contains distributed evenly therethrough a fungistat, and similarly the dressing has a fungistat distributed evenly through it. In a still more particular sense, either the food component or the dressing, or both, contains ethylenediaminetetraacetic acid, as such or as its soluble salts, in addition to the fungistat.

The food additives are particularly effective in preserving vegetables or foods substantially free of fats, e.g. not more than 0.5% fat by weight. Such foods are characterized by having volatile and labile carbonyl compounds, e.g. aldehydes and ketones. In such foods carbonyls impart flavor. It is noted that fresh raw vegetables will remain highly acceptable for long periods, but once cooked, flavor deterioration takes place rapidly in spite of the fact that the enzymes are deactivated by cooking.

The preferred products of the present invention comprise a "ready to eat" refrigerated salad wherein not one component of the salad can in itself support the growth of food poisoning bacteria. Hence when each of these components is subsequently blended to prepare the refrigerated salad, the salad itself will not support the growth of harmful bacteria. The preferred products of this invention may be kept for weeks at room temperature without fear of causing sickness when eaten. However, it is recommended that these products be kept under refrigeration to help maintain the flavor stability, and to inhibit the growth of microorganisms that might affect flavor and which are resistant to restricting influences of the fungistatic agent. The elimination of the potential food poisoning hazard is accomplished by treating each component of the salad with an acidifying agent in conjunction with a fungistatic agent in such a way that each component contains the acidifying and fungistat dispersed or dissolved therein at an effective level of concentration. An alternate method for manufacture of the "ready to eat" salads, involves incorporation into each of the components of the salad, other than the dressing, sufficient concentration of the preserving agents to render these components incapable of supporting the growth of harmful bacteria. Conventional dressings are then added to complete the salad. In this way, the more susceptible components of the salads are protected from the very first stages of process until incorporated into the finished product. The dressing itself, even though resistant to microbiological spoilage, will profit from migration of the preserving agents from the treated food components. It is desirable to add the preserving agents or food additives at a concentration of about 25 to 50% in excess when only the solid components of the salad are supplemented with the preserving agents.

The desirable acidifying agents are those which are edible such as for example acetic acid preferably in the form of vinegar, citric acid, lactic acid and phosphoric acid, however acetic acid is preferred. The edible acidifying agent is present in an amount to provide a pH of about 3 to 6.

The fungistatic or preserving agents incorporated into each component of the salad are organic free-carboxylic acids, their alkyl esters, where the alkyl radical contains 1 to 5 carbon atoms, such as the methyl, ethyl and propyl, etc., esters, and their edible alkali-metal and alkaline earth metal salts, such as the sodium, potassium, magnesium and calcium salts, respectively. Included among these carboxylic acids are the saturated lower aliphatic acids, including propionic and diacetic acids and the alpha-beta unsaturated carboxylic acids of the following formula:

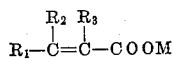

wherein that portion of the molecule containing the alpha-beta unsaturation may be either an aliphatic group or part of an aromatic ring. Where more than one unsaturated carbon to carbon linkage exists in the molecule, such unsaturation is part of a conjugated double bond system with alpha-beta carbon to carbon unsaturation. In the formula above, $R_1$ is hydrogen when $R_2$ and $R_3$ combine to complete a single carbocyclic nucleus; $R_1$ is a carbon atom of an aliphatic hydrocarbon group when $R_2$ and $R_3$ are hydrogen atoms or alkyl groups and M is selected from an edible metallic cation, hydrogen and an alkyl group containing 1 to 5 carbon atoms. Examples of such acids are: crotonic, isocrotonic, beta-ethylacrylic, dimethylacrylic, alpha-hexenoic, sorbic, benzoic and para-hydroxybenzoic acids, etc. The aliphatic compounds containing the alpha-beta unsaturation are preferred for this invention. For the purpose of this specification and the appended claims, an organic carboxylic acid component includes generically the free acid, the alkyl ester and the soluble metal salts thereof, as limited hereinabove in regard to the alkyl group and the metallic cation.

It was found that when the fungistat was used in combination with ethylenediaminetetraacetic acid, as such or as its soluble salts, an unexpected cooperation takes place in respect to prolonging the shelf life of cooked foods, particularly salads, from the standpoint of micro-biological growth and flavor. Neither the fungistat nor the ethylenediaminetetraacetic acid component alone produces such a result, and it is apparent from tests made on each additive that the combined effect is greater than what would be expected from the individual effects of each additive. The ethylenediaminetetraacetic acid component is used in the cooked food in an amount of about 0.0004 to 2% by weight, more usually about 0.004 to 0.1%, and preferably about 0.004 to 0.006% on the same basis. The fungistat is present in the cooked food in amounts of about 0.015 to 0.3% by weight, and preferably about 0.05 to 0.15% on the same basis. The expression, "ethylenediaminetetraacetic acid component," is generic to the free acid and its mono-, di-, tri-, or tetra-salt, having the cations consisting of sodium, potassium or calcium alone or in combination thereof.

The material to which the preserving agents are added can be any cooked foodstuff which is susceptible to microbiological growth and undergoes flavor deterioration upon standing. The outstanding use of the invention is in regard to food salads, wherein the solid food component is, for example, macaroni, meat, fish, egg, potato, cabbage, and other vegetables, and the dressing is, for example, mayonnaise, salad dressing, French dressing, etc. It is understood by those skilled in the art that mayonnaise is the emulsified semi-solid food prepared from edible vegetable oil, an acidifying ingredient and an egg-yolk-containing ingredient. It usually contains from about 65% to about 80% vegetable oil, vinegar from about 0.15% to about 0.70% as acetic acid, and liquid egg-yolk from about 4% to about 10%. Flavoring additives including spices, salt and sugar may be also added. Salad dressing contains in addition to the components, listed above for mayonnaise, a cooked or partly cooked starchy paste. Salad dressing contains from about 30% to about 50% vegetable oil, vinegar from about 0.5% to about 2.0% as acetic acid, and liquid egg-yolk from about 4% to about 7%. Flavoring agents including spices, salt and sugar may be also added. French dressing is the separable liquid food or the emulsified viscous fluid food prepared from edible vegetable oil and an acidifying ingredient. It usually contains from about 35% to about 70% vegetable oil and vinegar from about 0.5% to about 2.0% as acetic acid. Flavoring agents including spices, salt and sugar may be also added. A strained tomato product may also be included. The emulsifying agent in French dressing is usually a vegetable gum and it is used in an amount of from about 0.15% to about 0.75%. The above described dressings can be stored for long periods of time, e.g. about 3–5 months at room temperature, but when used as a component of a food salad, the entire salad has a short shelf life as discussed above.

The solid food component of the salad comprises about 15 to 95%, preferably about 50 to 85% of the salad, whereas the dressing constitutes about 5 to 85% preferably 15 to 50% of the same, on a weight basis.

In the preparation of the cooked foods, it is important that the fungistat and the ethylenediaminetetraacetic acid component, when added, be distributed at the opportune time throughout the food at levels sufficiently high to be effective in preserving the same at the very outset. In the case of food salads, the problem is especially important, because if the additive is preferentially oil soluble and it is incorporated into the oil containing dressing only, it may be difficult or impossible to obtain effective distribution by reliance upon migration. To obtain the desired concentration, the food is prepared with that aim in mind. For example, due to diffusion barriers in the form of cell walls, raw foods, such as potatoes, etc., are not penetrated by the additives to any significant extent, consequently, these foods cannot be protected to the extent of the present invention. By the present invention, the foodstuffs are cooked or prepared under conditions facilitating immediate dispersion or spreading of the additive throughout the food to the extent that the additive is present throughout the food at levels sufficiently high to be effective as a preservative. Food salads require special treatment, particularly in the case of potato salads in order that the additives become distributed properly. The method to be used in the case of food salads will be illustrated by reference to a potato salad preparation.

The preferred potato salad products of this invention may be made as follows: the potatoes are washed and peeled through the use of conventional equipment. If lye is used during the peeling operation, it is desirable to neutralize any excess lye adhering to the potato after peeling, with an acid wash. The potatoes are then diced or sliced into the desired final size thus insuring more complete penetration of the preserving agents therein. The subdivided potatoes are cooked in an aqueous solution containing an acidifying agent, a fungistatic agent, the ethylenediaminetetraacetic acid component and salt. The potato pieces are then cooled, preferably in a liquid cooling medium containing the same additives to prevent leaching out of the protective additives, and finally drained. The dressing contains the acidifying, fungistatic agent and the ethylenediaminetetraacetic acid component. If chopped vegetable meats are used, it is preferred that they originally be dehydrated so that during rehydration, the acidifying agent, fungistat and the ethylenediaminetetraacetic acid component can be readily absorbed from the reconstituting liquor. The prepared potatoes are then blended gently with the dressing and reconstituted vegetable meats. After the blending operation is complete, the product is packaged through the use of conventional packaging equipment.

The pH of the potatoes after cooking should be between 6.0 and 3.0, the lower limit being governed by the desired flavor. The preferred pH of the cooked potato is between 5.0 and 4.0. The potatoes after cooking should contain throughout, a fungistatic agent at a minimum level of 0.015%, but not greater than 0.5%, and preferably not less than 0.05%. It is desired that when the pH value of the cooked potato falls within the higher acceptable range, i.e., 6.0 to 5.0, that the fungistatic agent be present at a level not less than 0.05%. It is also preferred that the ethylenediaminetetraacetic acid component be incorporated into the potato during the cooking operation in a quantity not less than 4 p.p.m. and not in excess of 1000 p.p.m. or 0.0004 to 0.10% by weight, based on the potato.

It is not sufficient to allow the raw potato, skinned and sectioned, to be immersed in a liquor containing the preserving agents described in this invention and depend on the migration of said preservatives at room or lower temperature for penetration into the potato. The potato must be cooked to a point where starch gelatinization and protein denaturation occurs with attendant rupture of cell walls before effective migration of the preserving agents into the potato can take place. To be effective, the preserving liquor must be in contact with the potato section during and/or after the cooking operation.

The potatoes may be air cooled after the cooking operation is complete. However, there is a tendency for the surface dehydration of the potato to cause subsequently dehydration of the added dressing component. It is therefore preferred to cool the potatoes in a liquid containing the food additives in a concentration which is equivalent to that in the cooked potato so as to prevent the reverse migration of the preserving agent into the cooling medium.

The cooking operation may be done at atmospheric pressure, the potatoes being preferably immersed in an equal weight of the preserving liquor. The preserving liquor should contain the following components in an aqueous solution or dispersion in such a concentration that after equilibrium takes place between the cooking liquor and the potato, the potato should contain at least 0.05% but not more than 3.0% of acidifying agent, e.g. acetic acid derived from vinegar, and preferably 0.2%; at least 0.015% but not more than 0.5% and preferably 0.1% of a fungistatic agent such as, for example, sorbic acid; at least 0.1% but not more than 3.0% of common table salt and preferably 1.0%; and finally at least 4 p.p.m. and not more than 1000 p.p.m., or 0.0004 to 0.10%, and preferably 50 p.p.m. or 0.005% of ethylenediaminetetraacetic acid, as such or its equivalent in the form of a soluble salt. In view of the small quantity of ethylenediaminetetraacetic acid component and the unknown manner in which such a component coacts with unknown substances in the cooked product and in the cooking liquor, the presence thereof in cooked foods may defy analysis. However, the improvement in the stability of the foods effected by the use of such component indicates its presence in foods. The cooking liquor may be discarded after each batch or it may be reused after replenishment of the food additives that had migrated into the potato. Variations in the cooking operation may be made such as for example: Cooking the potato sections in the preserving liquor at elevated pressures; parboiling in water followed by additional cooking in the preserving liquor; or cooking in water until tender followed by cooling and pickling in the preserving liquor.

The potatoes after cooking are preferably cooled in a liquid medium. The potatoes may be cooled in the cooking liquor through the use of an appropriate heat exchanger or they may be drained and immersed in a prechilled cooling liquor which contains dissolved or dispersed therein the preserving agents at the same concentration as in the potatoes.

The dressing for the salad may consist of mayonnaise, salad dressing, French dressing, any combination of oil and vinegar, and combinations thereof with or without added sugar, salt and other flavor components. The preferred dressings contain an edible acidifying agent such as for example acetic acid in the form of vinegar at a concentration about equal to that contained in the cooked potato sections of this invention but less than 3.0% and common table salt at a level about equal to that found in the cooked potato but less than 3.0%. The dressing also contains a fungistatic agent such as for example sorbic acid, at a level about equal to that found in the cooked potato but less than 0.5%; and with or without the ethylenediaminetetraacetic acid component at a concentration about equal to the concentration found in the potato but less than 1000 p.p.m. (0.10%). The object of maintaining the level of the additives in the preferred dressings about equal to their levels within the cooked potato in the preferred products of this invention is to minimize the migration of said agents from the cooked potato into the dressing. When the additives (acid, preserving agent, and ethylenediaminetetraacetic acid component) are present in smaller concentrations in the dressing in relation to the solid food components, or even not at all in the less preferred products of this invention, then it is essential that sufficiently high concentration of these additives be initially in the solid food components to yield concentrations within limits previously specified following migration into the dressing.

Chopped vegetables may be added as optional ingredients to the salad. Blanched dehydrated vegetables are preferred not only because of their ease of handling and storage but during the reconstitution process, the meats are readily rehydrated in an aqueous solution containing an edible acidifying agent in conjunction with an edible fungistatic agent, with or without the ethylenediaminetetraacetic acid. The reconstituted vegetables with additives in the proper concentration range therefore would be in equilibrium with the other components of the salad and therefore would minimize migration tendencies toward changes in concentration. The dehydrated vegetables would not constitute a source of enzymic reactions or contribute undesirable microorganisms. Fresh vegetables may be used as less preferred ingredients provided they are pasteurized and enzyme inactivated through proper heat treatment. The fungistatic agent and the ethylenediaminetetraacetic acid component may be added during or after the pasteurization.

The examples given hereinafter serve to illustrate methods of practicing the present invention, it being understood, however, that the conditions set forth in the following examples are used as illustrations for a fuller understanding thereof and that no undue limitations or restrictions are to be imposed by reason thereof.

EXAMPLE I

Potato salad

| Ingredient: | Parts by weight |
|---|---|
| Potato component—Diced cooked potatoes | 75.0 |
| | |
| Dressing component— | |
| Mayonnaise | 16.00 |
| Sugar | 1.80 |
| Salt | 0.13 |
| Spices | 0.75 |
| Sorbic acid | 0.019 |
| Ethylenediaminetetraacetic acid | 0.001 |
| Total | 18.700 |
| | |
| Vegetable component (rehydrated basis)— | |
| Celery | 1.2 |
| Red and green sweet peppers | 1.9 |
| Onion | 3.2 |
| Total | 6.3 |
| | |
| Grand total | 100.00 |

The potatoes were prepared as follows: The whole potatoes were washed and peeled by a conventional abrasive peeler after which the eyes and blemishes were removed by hand. Dicing to a ½″ cube was accomplished through the use of a conventional vegetable dicer. The cubes were then rinsed and weighed into a stainless steel perforated basket and immersed into a kettle containing an equal weight of boiling liquor of the following composition:

| Cooking liquor: | Parts by weight |
|---|---|
| Water | 93.78 |
| Vinegar (100 gr. spirit) | 4.00 |
| Salt | 2.00 |
| Sorbic acid | 0.20 |
| Ethylenediaminetetraacetic acid | 0.02 |
| Total | 100.00 |

After boiling is resumed, the potato cubes were cooked for about 25 minutes or until tender. The basket containing the potatoes was then removed, drained and immersed in a second kettle containing an equal weight of continuously chilled cooling liquor of the following composition:

| Cooling liquor: | Parts by weight |
|---|---|
| Water | 96.89 |
| Vinegar (100 gr. spirit) | 2.00 |
| Salt | 1.00 |
| Sorbic acid | 0.10 |
| Ethylenediaminetetraacetic acid | 0.01 |
| Total | 100.00 |

After the potato cubes were cooled to 90° F., the basket containing the potato was removed, drained and emptied into a blending kettle.

On a continuous manufacturing basis, the remaining cooking and cooling liquors are replenished with the various components to bring them back to the concentrations indicated above.

The dressing component was prepared by blending the mayonnaise with the sugar, salt, spices and the desired additives.

The dehydrated vegetable meats were reconstituted for a period of 6 hours in the refrigerator in a liquor, the composition of which was the same as that of the potato cooling liquor. Ten parts of reconstitution liquor were used per one part of the vegetable meats. The vegetables were drained after reconstitution was complete. The dressing, vegetable meats and potatoes were combined, blended and filled into containers through the use of conventional packaging equipment and the salad refrigerated at 40° F.

EXAMPLE II

Potato salad

| Ingredient: | Parts by weight |
|---|---|
| Potato component—diced cooked potatoes | 80.0 |
| | |
| Dressing component— | |
| Mayonnaise | 11.479 |
| Sugar | 0.900 |
| Salt | 0.100 |
| Spices | 0.510 |
| Sorbic acid | 0.010 |
| Ethylenediaminetetraacetic acid | 0.001 |
| Total | 13.000 |
| | |
| Vegetable component (rehydrated basis)— | |
| Celery | 1.33 |
| Red and green sweet peppers | 2.11 |
| Onion | 3.56 |
| Total | 7.00 |
| | |
| Grand total | 100.00 |

The whole potatoes were washed, then peeled through the use of a conventional lye peeling process. The potatoes were then continuously passed through a vat containing 0.5% acetic acid, in the form of vinegar, to neutralize the excess caustic adhering to the potatoes, followed by a water spray rinse. After dicing, the potatoes were weighed into a perforated stainless steel basket and immersed in a kettle containing an equal weight of boiling water. The potato cubes were cooked for 5 minutes after boiling resumed, then the following preserving agents were added per 93.83 parts of the cooking water:

| | Parts by weight |
|---|---|
| Vinegar (100 gr. spirit) | 4.00 |
| Salt | 2.00 |
| Sorbic acid | 0.15 |
| Ethylenediaminetetraacetic acid | 0.02 |
| Total | 6.17 |

After the preserving agent addition the potatoes were cooked for an additional 10 minutes at which time they were satisfactorily soft. The potatoes were then removed, drained and cooled in an equal weight of the cooling liquor, the composition of which was the same as that given in Example I. After cooling to 90° F. as in Example I, the potatoes were drained and transferred to the blending kettle.

The dressing component was prepared by blending the mayonnaise with the sugar, salt, spices and preserving ingredients.

The dehydrated vegetable meats were reconstituted as in Example I.

The vegetables and dressing were combined and blended with the potato component after which the product was filled into jars and refrigerated at 35° F.

EXAMPLE III

The composition of Example I wherein salad dressing was substituted for the mayonnaise ingredient of the dressing component.

The potatoes were peeled through the use of conventional steam peeling equipment. After removing the skins, eyes and blemishes, the whole potatoes were cooked in an equal weight of a 2.0% solution of common table salt in water, until tender. After draining, the potatoes were diced through the use of conventional equipment. Following the dicing operation, the potato cubes were immersed in an equal weight of a pickling solution of the following composition for a period of about 20 hours.

*Pickling solution*

| Ingredient: | Parts by weight |
|---|---|
| Water | 92.38 |
| Vinegar (100 gr. spirit) | 5.00 |
| Salt | 2.00 |
| Sodium propionate | 0.60 |
| Ethylenediaminetetraacetic acid | 0.02 |
| Total | 100.00 |

At the end of the pickling period, the potato cubes were drained and blended with the dressing component and reconstituted vegetable meats, the latter two components being prepared as described in Example I. Following the blending operation, the potato salad was packaged into containers and refrigerated at 50° F.

EXAMPLE IV

*Potato salad*

| Ingredient: | Parts by weight |
|---|---|
| Potato component—Diced cooked potatoes | 85.0 |
| Dressing component—Mayonnaise | 15.00 |
| Grand total | 100.00 |

The potatoes were peeled and diced as described in Example I. After dicing, the potatoes were cooked in an equal weight of liquor of the following composition for a period of about 25 minutes:

| Water | 93.78 |
|---|---|
| Vinegar (100 gr. spirit) | 4.00 |
| Sorbic acid | 0.20 |
| Salt | 2.00 |
| Disodium ethylenediaminetetraacetate | 0.02 |
| Total | 100.00 |

After cooking, the liquor was cooled by pumping it through an appropriate heat exchanger until the potatoes were cooled to 100° F. The potatoes were then drained, blended with the dressing component, packaged, and refrigerated at 35° F.

EXAMPLE V

*Potato salad*

| Ingredient: | Parts by weight |
|---|---|
| Potato component—sliced cooked potatoes | 80.0 |
| Dressing component— | |
|   Salad dressing | 16.248 |
|   Spices | 0.750 |
|   Benzoic acid | 0.002 |
|   Total | 17.000 |
| Vegetable component (rehydrated basis)—onion | 3.0 |
| Grand total | 100.000 |

Pre-peeled whole potatoes were purchased in an aqueous preserving liquor containing sodium bisulfite. After draining, the potatoes were given an acid wash with dilute vinegar and then sliced into ¼" slices. The potatoes were then weighed into a perforated stainless steel basket and immersed in an equal weight of the following preserving cooking liquor in a pressure cooker:

| Water | 93.80 |
|---|---|
| Vinegar (100 gr. spirit) | 4.00 |
| Salt | 2.00 |
| Benzoic acid | 0.20 |
| Total | 100.00 |

The potatoes were cooked in the pressure cooker at 15 pounds pressure for 9 minutes. After the pressure was released, the potatoes were drained and air cooled.

The pressing component was prepared by adding the benzoic acid and spices thereto.

The dehydrated onion was reconstituted in a preserving liquor, the composition of which was the same as the potato cooking liquor. After reconstituting the onion for a period of 4 hours in the referigerator, the onion was drained, blended with the dressing and this mixture blended with the cooled potatoes. The blend was then filled into containers and refrigerated at 45° F.

EXAMPLE VI

*Vegetable salad*

| Ingredient: | Parts by weight |
|---|---|
| Dressing component— | |
|   Mayonnaise | 50.0 |
|   Starch Base: | |
|     Flour | 2.0 |
|     Cornstarch | 0.4 |
|     Liquor drained from vegetable meats | 7.1 |
|     Water | 3.7 |
|     Sugar | 3.1 |
|     Salt | 1.7 |
|     Vinegar (100 gr. spirit) | 5.0 |
|     Sorbic acid | 0.036 |
|     Disodium calcium ethylenediaminetetraacetate | 0.014 |
|   Total | 73.050 |
| Vegetable component (rehydrated basis)— | |
|   Celery | 6.90 |
|   Red and green sweet pepper | 10.05 |
|   Onion | 10.00 |
|   Total | 26.95 |
| Grand total | 100.00 |

The dehydrated vegetable meats were reconstituted in seven parts of a liquor of the following composition per one part of the vegetable meats at 50° F. for a period of 20 hours.

*Reconstitution liquor for vegetable meats*

| Water | 93.77 |
|---|---|
| Vinegar (100 gr. spirit) | 4.02 |
| Salt | 2.00 |
| Sorbic acid | 0.20 |
| Disodium calcium ethylenediaminetetraacetate | 0.01 |
| Total | 100.00 |

Following the reconstitution period, the vegetable meats were drained, the excess liquor being reserved for the dressing component.

The starch base of the dressing component was prepared by blending the flour, cornstarch, sugar, salt, sorbic acid and the soluble salt of ethylenediaminetetraacetic acid with the vegetable meats liquor, water and vinegar in a cooking kettle. This mixture was heated with agitation to 195° F. for a period of 5 minutes and then cooled to 90° F. The mayonnaise, prepared starch base and drained rehydrated vegetable meats were then combined and blended, after which the product was filled into containers and refrigerated at 45° F.

The stabilized product of this example is useful in the home as a dressing for potato, macaroni, meat, fish and egg salads, as well as cole slaw. Such salads are refrigerated and usually consumed within a 3 to 4 day period however. The product of this example may also be used as a "dip" for potato chips, crackers, etc., and also as a spread for bread in the form of a salad.

EXAMPLE VII

*Macaroni salad*

| Ingredient: | Parts by weight |
|---|---|
| Macaroni component—cooked macaroni | 77.8 |
| Dressing component— | |
| Salad dressing | 15.600 |
| Sugar | 1.000 |
| Salt | 0.130 |
| Spices | 0.750 |
| Sorbic acid | 0.018 |
| Ethylenediaminetetraacetic acid | 0.002 |
| Total | 17.500 |
| Vegetable component (rehydrated basis)— | |
| Celery | 1.4 |
| Red and green sweet peppers | 2.7 |
| Onion | 0.6 |
| Total | 4.7 |
| Grand total | 100.0 |

The macaroni was cooked in a preserving liquor of the following composition:

| Cooking liquor: | Parts by weight |
|---|---|
| Water | 96.125 |
| Vinegar (100 gr. spirit) | 2.500 |
| Salt | 1.250 |
| Sorbic acid | 0.125 |
| Total | 100.000 |

Four parts of cooking liquor were used for each part of macaroni. After cooking for about 20 minutes in the preserving liquor, the macaroni was drained and air cooled.

The dressing component was prepared by combining the salad dressing with the sugar, salt, spices and preserving agents.

The dehydrated vegetables were reconstituted in a pickling liquor of the following composition for a period of 3 hours.

*Pickling liquor*

| | Parts by weight |
|---|---|
| Water | 96.89 |
| Vinegar (100 gr. spirit) | 2.00 |
| Salt | 1.00 |
| Sorbic acid | 0.10 |
| Ethylenediaminetetraacetic acid | 0.01 |
| Total | 100.00 |

Ten parts of reconstitution pickling liquor were used per one part of the vegetable meats. Following the reconstitution period, the vegetables were drained and blended with the dressing component. This mixture was then blended with the cooked macaroni, filled into containers and refrigerated at 45° F.

EXAMPLE VIII

*Egg salad*

| Ingredient: | Parts by weight |
|---|---|
| Egg component | 83.0 |
| Dressing component—Mayonnaise | 17.0 |
| Total | 100.0 |

The egg component was prepared by heating the following composition with slow agitation:

| Egg component: | Parts by weight |
|---|---|
| Whole egg | 85.2 |
| Milk | 10.8 |
| Salt | 0.5 |
| Vinegar (100 gr. spirit) | 3.0 |
| Sodium sorbate | 0.1 |
| Spices | 0.4 |
| Total | 100.0 |

After coagulation was complete the egg component was chopped and cooled to 80° F. The dressing and egg component were then combined, blended and filled into containers through the use of conventional equipment and then refrigerated at 45° F.

EXAMPLE IX

The composition and process of Example I wherein the ethylenediaminetetraacetic acid is omitted from the potato component, dressing component and vegetable component.

In making the products of this invention it is preferred that the base ingredient, such as potatoes for example, contains the acidifying and fungistatic agents dispersed therein at such concentrations so as to inhibit the growth of food poisoning bacteria and other micro-organisms responsible for other forms of food spoilage. Table 1 presents the results of studies on the migration of the acid and a preferred fungistatic agent, sorbic acid in the case of potatoes when these were cooked by the various methods that have been described hereinabove.

TABLE 1

*Migration of preserving agents into potato during the cooking process (1 part of potato plus 1 part of cooking liquor)*

| Potato sample | Percent total acid as acetic | Percent salt | Percent sorbic acid | pH | Texture |
|---|---|---|---|---|---|
| Control—½" cubes of potato cooked in water for 10 minutes, no additives. | 0.06 | 0.09 | 0.0 | 6.1 | Tender. |
| ½" potato cubes cooked in preserving [1] liquor for 25 min. at atmospheric pressure. | 0.31 | 1.04 | 0.10 | 4.3 | Do. |
| ½" potato cubes parboiled 5 min. in tap water followed by a 10 min. cook in preserving liquor.[1] | 0.30 | 1.03 | 0.10 | 4.3 | Do. |
| ½" potato cubes cooked 10 min. in tap water followed by pickling at room temperature for 20 hrs. in preserving liquor.[1] | 0.37 | 0.96 | 0.11 | 4.1 | Do. |
| ½" potato cubes cooked for 9 min. at 15 lbs. pressure in preserving liquor.[1] | 0.20 | 0.85 | 0.06 | 4.5 | Do. |

[1] Composition of preserving liquor:

| Ingredient: | Parts by weight |
|---|---|
| Water | 93.8 |
| Vinegar (100 gr. spirit) | 4.0 |
| Salt | 2.0 |
| Sorbic acid | 0.2 |

These results indicate that satisfactory penetration of the preserving agents takes place using any of the described cooking methods.

The migration of sorbic acid into raw potato was also studied. The results are given in Table 2.

TABLE 2

*Penetration of sorbic acid[1] into 1" cubes of raw potato at room temperature after a 72 hour contact period*

| Potato sample: | Percent sorbic acid |
|---|---|
| Outer ⅛" layer | 0.008 |
| Middle ⅛" layer | 0.006 |
| Center ½" cube | 0.005 |
| Control | 0.000 |

[1] 0.2% sorbic acid in water, one part potato to one part preservative solution.

The above results indicate that sorbic acid migration into raw potato is not significant and falls far short of the minimal level of 0.015% required for microbiological inhibition.

Potato salad prepared by methods used in the prior art depend on preservation through the use of an acidifying agent in conjunction with a fungistatic agent of which sorbic acid and benzoic acid are examples. However, these agents are added only to the dressing component. By this method there is inadequate protection offered to the product from the standpoint of microbiological spoilage since the vulnerable food component can be readily contaminated with undesirable microorganisms prior to the addition of the supplemented dressing and time is required before the migration of these agents into the potato is sufficient to prevent the growth and the activity of the microorganisms therein. The fungistatic agent is used in the prior art at a level of 0.1% in the dressing component. Sorbic and benzoic acids at levels higher than 0.3% in the dressing component are not acceptable from the flavor standpoint.

In the prior art, migration of sorbic acid from the dressing component into the potato component is severely hampered by its preferential solubility in the oil ingredient of the dressing component. Even at a level of 0.5% in the dressing component, the sorbic acid migrates slowly and fails to reach equilibrium before about 2 weeks, and even then nearly 80% of the sorbic acid still remains in the dressing component. In the case of benzoic acid, which has a higher distribution ratio between oil and water than has sorbic acid, migration from the dressing into the potato is even more limited. Dressings containing such high levels of sorbic or benzoic acid are not palatable.

The results obtained in evaluating the products of the present invention in relation to the products of the prior art, including extensions of the prior art, are given in Table 3. It is obvious that the compositions and processes of the present invention permit (1) the manufacture of a salad which is safe for extended periods from food poisoning hazards and spoilage due to microbiological activity, and (2) the manufacture of a salad which is remarkably resistant to the development of off flavors.

TABLE 3

*Evaluation of the examples given in relation to reference control products, all stored at refrigeration temperatures*

| Salad | Identity | Shelf life of product because of— | |
|---|---|---|---|
| | | Microbiological spoilage [1] | Flavor deterioration |
| | | Weeks | Weeks |
| Potato | Neither preserving agent nor ethylenediamine-tetraacetic acid added. | 1 | 1½ |
| Do | 0.1% sorbic acid in dressing | 3 | 1½ |
| Do | 0.5% sorbic acid in dressing | 10 | 2 0 |
| Do | Example I | >16 | >16 |
| Do | Example II | >16 | >16 |
| Do | Example III | 6 | 6 |
| Do | Example IV | 12 | 12 |
| Do | Example V | 7 | 3 |
| Vegetable | Example VI | >16 | >16 |
| Macaroni | Example VII | >16 | 16 |
| Egg | Example VIII | 12 | 8 |
| Potato | Example IX | >16 | 3 |

[1] Noted as gaseous fermentation in the product and/or excessively high bacterial counts.
[2] Inedible because of the flavor of the preservative overpowering that of the dressing.

Having thus given a written description of the invention along with specific examples, it should be understood that no undue limitations or restrictions are to be imposed by reason thereof, but that the scope of this invention is defined by the appended claims.

We claim:

1. A composition comprising the combination of about 0.0004 to 2% of an ethylenediaminetetraacetic acid component and about 0.015 to 0.3% of an edible fungistat.

2. A composition comprising about 0.0004 to 2% of an ethylenediaminetetraacetic acid component and about 0.015 to 0.3% of an edible fungistatic organic carboxylic acid component.

3. A composition comprising the combination of about 0.004 to 0.1% of an ethylenediaminetetraacetic acid component and an edible fungistat having the formula

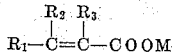

wherein $R_1$ is hydrogen when $R_2$ and $R_3$ combine to complete a single carbocyclic nucleus; $R_1$ is a carbon atom of an aliphatic hydrocarbon group when $R_2$ and $R_3$ are hydrogen-atoms and M is selected from the group consisting of an edible metallic cation, hydrogen and an alkyl group containing 1 to 5 carbon atoms.

4. A composition comprising about 0.004 to 0.1% of an ethylenediaminetetraacetic acid component and about 0.015 to 0.3% of sorbic acid.

5. A composition comprising about 0.0025 to 0.01% of an ethylenediaminetetraacetic acid component and about 0.05 to 0.15% sorbic acid.

6. A composition comprising about 0.004 to 0.1% of an ethylenediaminetetraacetic acid component and about 0.015 to 0.3% of benzoic acid.

7. A food salad comprising about 15 to 95% of a solid food component, said food component containing about 0.015 to 0.3% an edible fungistat and about 0.0004 to 2% of an ethylenediaminetetraacetic acid component distributed evenly therethrough, and about 5 to 85% of an edible dressing, said dressing containing about 0.015 to 0.3% fungistat and about 0.0004 to 2% of the ethylenediaminetetraacetic acid component distributed evenly therethrough.

8. A food salad having high flavor stability and high resistance to microbiological spoilage comprising a food containing about 0.015 to 0.3% of an edible fungistat and about 0.0004 to 2% of an ethylenediaminetetraacetic acid component distributed evenly therethrough, said food having a pH less than about 6.

9. A food salad having high flavor stability and high resistance to microbiological spoilage comprising a food containing about 0.015 to 0.3% of an edible fungistatic organic carboxylic acid component and about 0.004 to 0.1% of an ethylenediaminetetraacetic acid component distributed evenly therethrough, said food having a pH less than about 6.

10. A food salad having high flavor stability and high resistance to microbiological spoilage comprising a food containing about 0.0025 to 0.01% of an ethylenediaminetetraacetic acid component and about 0.05 to 0.15% sorbic acid, said food having a pH less than about 6.

11. A food salad having high flavor stability and high resistance to microbiological spoilage comprising a food containing about 0.0025 to 0.01% of an ethylenediaminetetraacetic acid component and about 0.05 to 0.15% benzoic acid, said food having a pH less than about 6.

12. A composition comprising about .0004 to 2% of an ethylenediaminetetraacetic acid component, about 0.015 to 0.3% of an edible fungistat and an edible acidifying agent sufficient to provide a pH of not more than about 6.

13. A food salad comprising about 15 to 95% of a solid food component selected from the group consisting of potato, macaroni, cabbage, meat, fish and egg, said food component containing about 0.015 to 0.3% of an edible fungistat and about 0.004 to 0.1% of an ethylenediaminetetraacetic acid component distributed evenly therethrough, and about 5 to 85% of an edible dressing, said dressing containing about 0.015 to 0.3% of an edible fungistat distributed evenly therethrough, said salad having a pH of less than about 6.

14. The food salad of claim 13 wherein the edible dressing is selected from the group consisting of mayonnaise, salad dressing and French dressing.

15. The food salad of claim 13 wherein the fungistat is an organic carboxylic acid component.

16. A food salad comprising about 15 to 95% of a solid food component and about 5 to 85% of an edible dressing, said food salad containing about 0.015 to 0.3% of an edible fungistat and about 0.0004 to 2% of an ethylenediaminetetraacetic acid component.

17. The food salad of claim 16 wherein the fungistat is an organic carboxylic acid component.

18. A composition comprising about 0.0013 to 133 parts by weight of an ethylenediaminetetraacetic acid component per part of an edible fungistat.

19. The composition of claim 18 wherein the fungistat is an edible fungistatic organic carboxylic acid component.

References Cited in the file of this patent

UNITED STATES PATENTS

| | | |
|---|---|---|
| 2,379,294 | Gooding | June 26, 1945 |
| 2,474,227 | Coleman et al. | June 28, 1949 |
| 2,563,835 | Gribbins et al. | Aug. 14, 1951 |
| 2,607,745 | Magoffin | Aug. 19, 1952 |
| 2,707,154 | Lehmann et al. | Apr. 26, 1955 |
| 2,722,483 | Winkler | Nov. 1, 1955 |
| 2,732,386 | Kuhrt | Jan. 24, 1956 |